United States Patent

[11] 3,557,676

| [72] | Inventor | Richard Wurster<br>Hofenenz, Germany |
|---|---|---|
| [21] | Appl. No. | 718,819 |
| [22] | Filed | Apr. 4, 1968 |
| [45] | Patented | Jan. 26, 1971 |
| [73] | Assignee | Prontor-Werk Alfred Gauthier, G.m.b.H.<br>Calmbach, Germany<br>a corporation of Germany |
| [32] | Priority | Dec. 27, 1967 |
| [33] | | Germany |
| [31] | | P41847 |

[54] PHOTOGRAPHIC CAMERA WITH RELAY RELEASE
5 Claims, 3 Drawing Figs.

[52] U.S. Cl. .................................................. 95/53.3,
95/53.6
[51] Int. Cl. .................................................. G03b 9/64
[50] Field of Search ........................................... 95/53.3,
53.6

[56] References Cited
UNITED STATES PATENTS

| 2,935,005 | 5/1960 | Barth ........................... | 95/53.6 |
| 2,973,701 | 3/1961 | Rentschler .................... | 95/53.6 |
| 2,979,999 | 4/1961 | Rentschler .................... | 95/53.6X |
| 3,117,505 | 1/1964 | Weller ......................... | 95/53.3 |
| 3,339,473 | 9/1967 | Wurster ........................ | 95/53.3 |

Primary Examiner—John M. Horan
Assistant Examiner—Michael Harris
Attorney—March, Gillette & Wyatt ABSTRACT: A photographic camera with relay release that has a shutter housing and a shutter blade drive mechanism. A relay slide is movably guided on the shutter housing under the influence of a motor spring. The relay slide has a tab cooperating with a rotatably mounted locking lever for locking the relay slide in the wound position. In addition, a positioning pin is provided on the relay slide for cooperating with a locking lever for the shutter blade drive mechanism to release the latter.

INVENTOR
Richard Wurster
BY
March, Gillette & Wyatt
ATTORNEYS

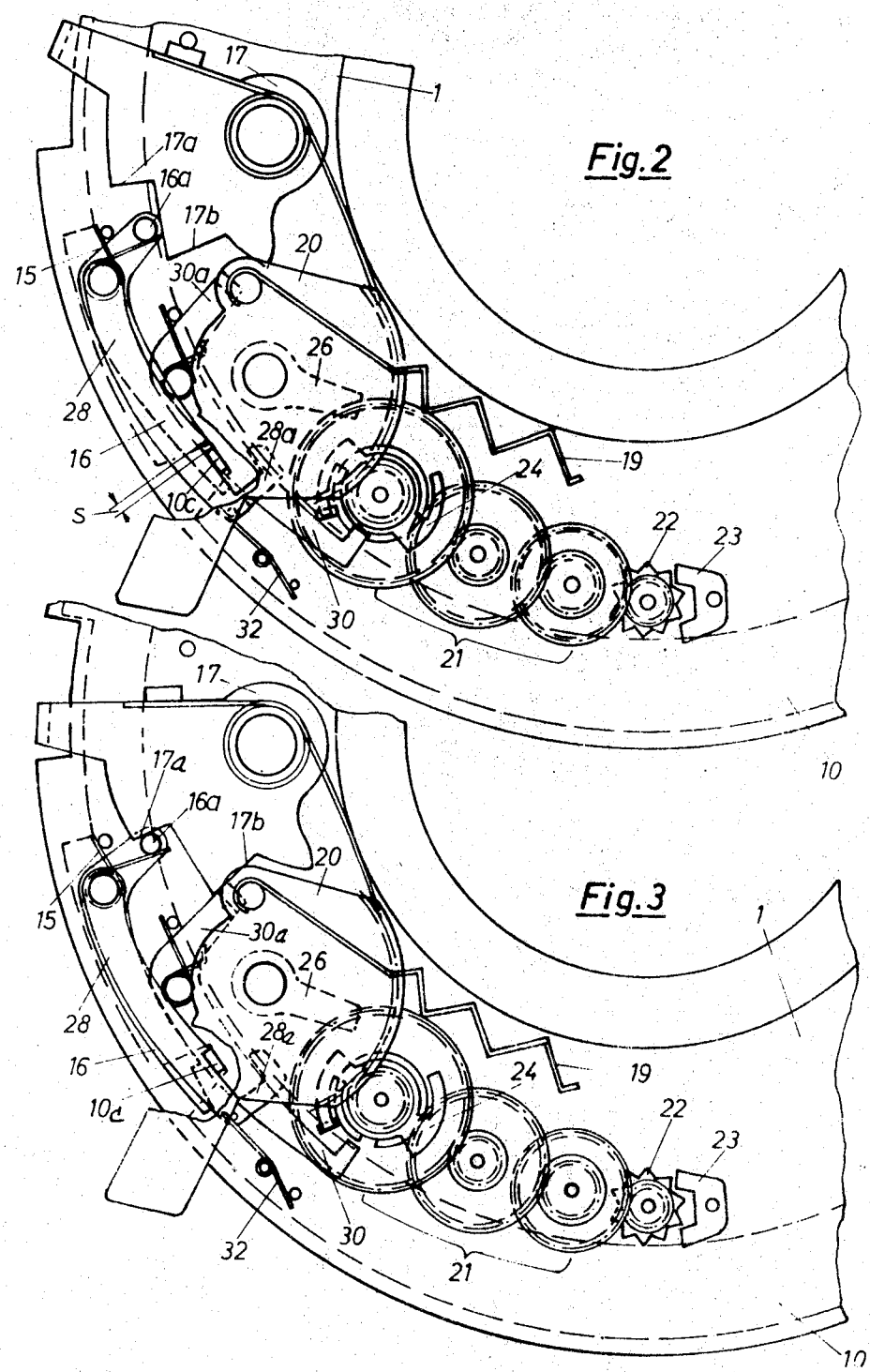

PHOTOGRAPHIC CAMERA WITH RELAY RELEASE

This invention relates to a photograph camera with relay release. Cameras with such a device that transmits the release impulse imparted to the camera release with time delay to the release mechanism of the shutter are already known. To the extent that such relay arrangements are known, the disadvantage inherent in them is that they are relatively complex from a structural point of view and, therefore, are difficult to accommodate in the shutter housing, and if so accommodated it is at the expense of an extremely compact design of the shutter. This is especially so if the shutter housing additionally has to accommodate an advance runoff system.

As to the construction of the known relay arrangements, they usually consist of a spring-driven cam disc which is mounted so that it can rotate and be released for runoff by the camera release and which, in turn, acts upon the locking bolt associated with the shutter drive mechanism by means of transmission levers or the like. But since the motor spring serving to drive the cam disc must be made as weak as possible with respect to the maximum overall winding moment of the camera because of existing restrictions, the function of these known arrangements leaves something to be desired with regard to reliability of the releasing process. Troubles in the functional runoff of the relay are not avoidable when the frictional resistance in the bearing points of the movable parts of the relay increase, which is quite possible after the elapse of a certain life span of a camera.

It may then happen that the camera is released, but that the shutter will not be released for runoff.

It is an object of this invention, to provide with relatively few structural elements i.e. with fewer components than the known arrangements require, a relay release for cameras, distinguished by an optimum in simplicity and functional reliability.

It has now been found that the foregoing and related objects can be readily attained in a photographic camera with relay release having a slide, movably guided in the shutter housing and under the influence of a motor spring, wherein the slide serves as relay. The slide carries a tab cooperating, for locking the slide in wound position, with a rotatably mounted locking lever and which slide carries a positioning pin or the like, cooperating, for releasing the shutter blade drive mechanism, with the latter's locking lever. It is thus possible, with relatively simple structural means, to create a relay consisting, for all practical purposes, of but one single part. Due to its slidelike design, so much kinetic energy can be imparted to this part during its runoff course, even when a relatively weak motor spring is used, that a reliable release of the shutter drive is guaranteed.

Since the mass of the slide is of essential importance for the design of the relay according to the invention, it is further proposed according to the invention that the slide be designed as open or closed ring and rotatable in a guide disposed coaxially with the objective aperture of the shutter. From a design and manufacturing point of view, one advantageous implementation of the invention is seen in that the annular slide is provided with a stop, upon which acts a positioning cam moved along with the shutter drive mechanism when the latter is transferred into wound position, thereby bringing the annular slide also into the wound position against the effect of the motor spring acting on it. An annular slide equipped with these features has the advantage of being transferable, without any additional structural expense worth mentioning, into the wound position together with the shutter when the latter is being cocked.

A simple connection which assures synchronization and reliable cooperation between the annular slide and the shutter blade drive mechanism can be obtained when the stop is formed by an overriding pawl disposed so as to pivot on the annular slide and when the positioning cam cooperating with it is mounted on the drive shaft so as to corotate with the latter.

The slidelike relay can be applied to particular advantage in cameras equipped with a self timer release, whereby an additional retardation in releasing the shutter is provided in the form of a built-in advance runoff system. For this purpose, the arrangement is such that coaxially with the locking lever keeping the annular slide in wound position, there is pivoted another locking lever which blocks the annular slide, after its release, for the duration of the runoff time of the advance runoff system when pictures employing such a system are to be taken.

Other objects and advantages will be readily apparent from the following detailed specification and claims and the drawings appended hereto wherein:

FIG. 2 is a partial view illustrating the advance runoff system of FIG. 1 wherein the advance runoff system and the relay are transferred into wound position.

FIG. 3 is a view similar to FIG. 2 with the advance runoff system released for runoff but with the relay still locked and in the wound position.

Figure 1:
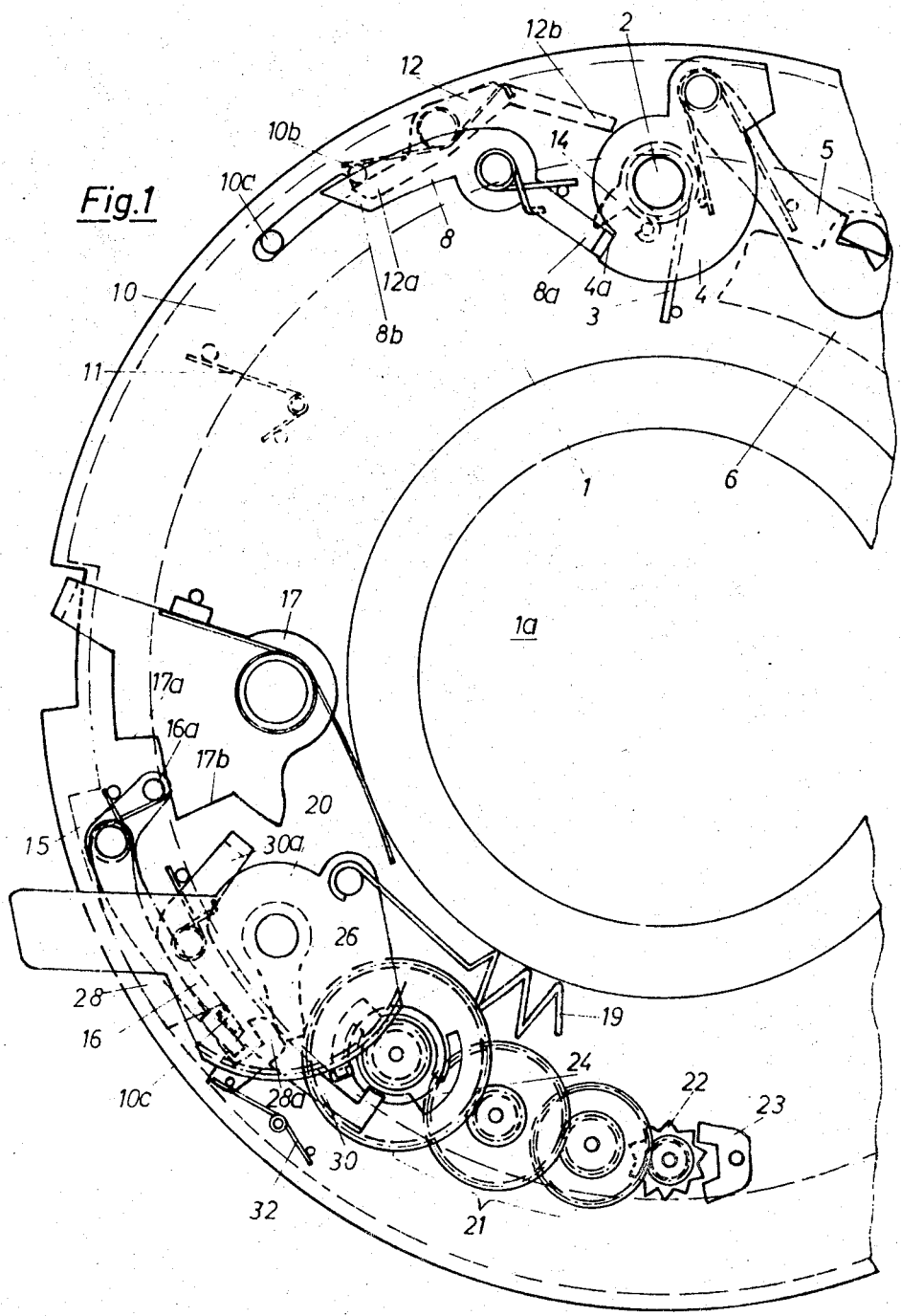
FIG. 1 is a partial view of a camera shutter with a relay and built-in advance runoff system, wherein the shutter drive mechanism as well as the relay are in the wound position and the advance runoff system is in the unwound initial position.

Referring now to the drawings, there is illustrated the drive mechanism for the sectors, not shown, of a camera shutter. The drive mechanism is disposed on a base plate, designated by the reference numeral 1, provided with an objective aperture 1a. This drive mechanism is designed as a push-type crank drive and consists of a driving disc 4 mounted on a winding shaft 2 under the influence of a drive spring 3 as well as of a push pawl 5. The push pawl 5 engages a sector ring 6 which is moved back and forth during the runoff of the shutter drive. The shutter drive can be held in the wound position shown in FIG. 1 by means of a dual-armed locking lever 8 having one arm 8a movable in and out of the range of motion of the edge 4a of the driving disc 4.

The shutter arrangement briefly described above involves one with which extremely short exposure times, such as in the order of about 1/1000 of a second are achievable by storing a relatively high winding moment. In order to be able to release a camera equipped with such a shutter "softly" and without shaking the camera, it is desirable to provide a relay which transfers to the release mechanism of the shutter, with time delay, the releasing pressure imparted to the camera release.

A slide 10, designed in the disclosed embodiment as a closed ring is movably guided in the interior of the shutter housing and can be used as relay. The annular slide 10, biased to move in a clockwise direction by a motor spring 11, is provided with a positioning pin 10a which, when the ring 10 runs off, runs against the beveled face of an arm 8b of the locking lever 8, thereby throwing the lever 8 out of the locking position. The transfer of the annular slide 10 into the wound position according to FIG. 1 takes place simultaneously with the winding of the shutter drive. For this purpose, there is pivoted at the annular slide 10 a dual-armed override pawl 12 one arm 12a of which supports itself, under spring action, against a pin 10b of the annular slide 10. The other arm 12b of the override pawl 12 cooperates with a positioning cam 14 which corotates with the winding shaft 2 and the driving disc 4. The arrangement is such that, when winding the shutter drive, the cam 14 runs against the arm 12b of the pawl 12 supporting itself against the pin 10b, thereby pushing the annular slide 10 into the wound position. In that position, an edge of a pivoted dual-armed locking lever 16 engages, under the effect of a spring 15, in front of a tab 10c of the annular slide 10, thereby locking it in the wound position. Associated with the locking lever 16 is a release lever 17 which, upon actuation of the shutter or camera release, is turned in a counterclockwise direction, whereby its edge 17a runs against a pin 16a so that the locking lever 16 is moved out of the locking position.

In order to be able to carry out self timing exposures with the shutter arrangement described above, self-timing mechanism is disposed on the base plate 1, consisting of a driving segment 20 charged by a motor spring 19, a movement 21 consisting of several gears and pinions, as well as a star wheel 22 and an escapement 23. The movement 21 has a clutch disc 24 which establishes a gear connection between the drive segment 20 and the movement 21 only when the drive segment 20 runs off from its wound position. When transferring the drive segment 20 into wound position, however, the movement 21 is not taken along by the clutch disc 24. Corotating with the drive segment 20 is an actuating arm 26 which cooperates with an angled-off protrusion 28a of a locking lever 28 mounted coaxially with the locking lever 16. To lock the self-timing mechanism in the wound position, another rotatably mounted locking lever 30 is provided having an arm 30a located in the range of motion of an edge 17b of the release lever 17.

To take a snapshot, i.e. an exposure without delay in the release of the shutter drive, the locking lever 16 is pushed out of the locking position by actuating the camera or shutter release, not shown, via the release lever 17 so that the annular slide 10 is driven with fast acceleration under the influence of the motor spring 11. After traversing a certain distance, the positioning pin 10a of the annular slide 10 strikes the face of the arm 8b of the locking lever 8 which, due to the kinetic energy residing in the annular slide 10, is thrown out of the locking position, whereupon the shutter drive can run off in the usual manner. To release the shutter drive which is under a relatively high winding moment, the photographer merely need apply enough releasing force to free the annular slide 10, which is a force considerably smaller than that required for the release of the shutter drive.

If, for taking a self-timer picture, the release of the annular slide 10 is to take place with a certain time delay, then the drive segment 20, after winding the shutter drive mechanism, is additionally turned counterclockwise against the force of the spring 19, whereby the actuating arm 26 leaves the angled-off protrusion 28a so that the locking lever 28 changes over, under the influence of a spring 32, into the locking position already assumed by locking lever 16 as illustrated in FIG. 2. Upon the actuation of the camera release, the annular slide 10 is first freed again by locking lever 16. After traversing short distances, the face of the tab 10c of the annular slide 10 strikes an edge of the locking lever 28 so that, as may be seen from FIG. 3, the annular slide is locked again. During the release motion, the locking lever 30 also is pivoted out of locking position by the edge 17b of the release lever 17 striking the arm 30a, and the advance runoff system starts running off. At the end of the runoff motion, the actuating arm 26 strikes the angled-off protrusion 28a, thereby pivoting the locking lever 28 clockwise so that the annular slide 10 can now run off unhindered and release the shutter drive in the manner described above.

It will be understood that the foregoing description with the details of exemplary structure is not to be construed in any way to limit the invention, but that modifications may be made thereto without departing from the scope of the invention as set forth in the following claims.

I claim:

1. A photographic camera with relay release having a shutter housing, a shutter blade drive mechanism, a relay slide movably guided on said shutter housing under the influence of a motor spring, said relay slide having a tab cooperating with a rotatably mounted locking lever for locking said relay slide in the wound position, and a positioning pin on said relay slide cooperating with a locking lever for said shutter blade drive mechanism to release the latter.

2. The camera of claim 1, wherein said relay slide is a ring rotatable in a guide on said shutter housing and disposed coaxially to an objective aperture of said shutter housing.

3. The camera of claim 2 wherein said relay slide has a stop, and wherein said stop is acted upon by a positioning cam operably connected to said shutter blade drive mechanism, said cam being movable with said shutter blade drive mechanism when said drive mechanism is transferred into the wound position to bring said relay slide into the wound position against the force of said motor spring engaging it.

4. The camera of claim 3 wherein said stop is formed by an overriding pawl pivoted on said slide and biased in one rotational direction, and wherein said positioning cam of said driving mechanism is engageable with said override pawl, said cam being mounted on a drive shaft of said driving mechanism so as to corotate therewith.

5. The photographic camera of claim 1 having a built in advance runoff mechanism and another locking lever, which, when taking pictures with said advance runoff mechanism, is engageable with said relay slide to lock said slide after release has taken place for the duration of the runoff time of said advance runoff mechanism, said another locking lever being pivotally mounted coaxially with said locking lever which holds said relay slide in the wound position.